(12) United States Patent
Westphal et al.

(10) Patent No.: US 7,194,149 B2
(45) Date of Patent: *Mar. 20, 2007

(54) SYSTEM AND METHOD FOR IMAGE COMPRESSION, STORAGE, AND RETRIEVAL

(75) Inventors: Geoffry A. Westphal, Park Ridge, IL (US); Mike McHugh, Grayslake, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 23 days.

This patent is subject to a terminal disclaimer.

(21) Appl. No.: 11/222,289

(22) Filed: Sep. 8, 2005

(65) Prior Publication Data

US 2006/0008160 A1 Jan. 12, 2006

Related U.S. Application Data

(63) Continuation of application No. 10/649,277, filed on Aug. 27, 2003, now Pat. No. 7,162,104.

(60) Provisional application No. 60/407,163, filed on Aug. 30, 2002.

(51) Int. Cl.
G06K 9/54 (2006.01)
H04N 5/76 (2006.01)

(52) U.S. Cl. .................................. 382/305; 348/231.2

(58) Field of Classification Search ............... 382/305, 382/313; 707/100–102, 104.1, 200; 348/231.2, 348/231.99, 333.05, 333.11
See application file for complete search history.

(56) References Cited

U.S. PATENT DOCUMENTS

| 5,164,831 | A  | 11/1992 | Kuchta et al. |
| 5,343,560 | A  | 8/1994  | Takeda et al. |
| 5,486,893 | A  | 1/1996  | Takagi |
| 5,635,984 | A  | 6/1997  | Lee |
| 5,835,627 | A  | 11/1998 | Higgins et al. |
| 6,148,149 | A  | 11/2000 | Kagle |
| 6,516,154 | B1 | 2/2003  | Parulski et al. |
| 6,665,015 | B1 | 12/2003 | Watanabe et al. |

OTHER PUBLICATIONS

Making Graphics Web Friendly, 4 pgs., http://web.utk.edu/~cwiek/watch/.

*Primary Examiner*—Vikkram Bali
*Assistant Examiner*—Colin LaRose
(74) *Attorney, Agent, or Firm*—Gary R. Jarosik

(57) ABSTRACT

A system and method for compressing and storing image data. The system and method creates for each of a plurality of original images a plurality of resultant images by altering the content of each of the plurality of original images a corresponding plurality of different ways. Each of the resultant images is then compressed. From the compressed, resultant images created from each of the plurality of original images one resultant image is selected. Each of the selected one of the plurality of resultant images is then stored such that each of the selected one of the plurality of resultant images is retrievable to be displayed as a representation of its corresponding original image.

14 Claims, 4 Drawing Sheets

SYSTEM AND METHOD FOR IMAGE COMPRESSION, STORAGE, AND RETRIEVAL

RELATED APPLICATION DATA

This application claims the benefit of and is a continuation of U.S. application Ser. No. 10/649,277 filed on Aug. 27, 2003, now U.S Pat. 7,162,104 which application is incorporated herein by reference in its entirety.

FIELD OF INVENTION

This invention relates to image compression. The invention also relates to systems and methods for storing compressed images and retrieving compressed images.

BACKGROUND

It is known in the art to use compression techniques to make graphics Web friendly. For example, a known Web page describes using Adobe PHOTOSHOP software to make graphics images smaller in terms of download time. To this end, the Web page describes using various techniques available in the PHOTOSHOP software to reduce the size of a JPG file. Specific examples set forth in the Web page include changing the resolution of an image, reducing the number of colors in an image, and/or changing the print size of an image to reduce the size of the image file and, thereby, allow for the faster downloading of the image file.

SUMMARY OF THE INVENTION

A system and method for compressing and storing image data. The system and method creates for each of a plurality of original images a plurality of resultant images by altering the content of each of the plurality of original images a corresponding plurality of different ways (e.g., by applying none, one, or combinations of imaging techniques to the original image in a plurality of different combinations and permutations). Each of the resultant images is then compressed. From the compressed, resultant images created from each of the plurality of the original images one resultant image is selected. Each of the selected one of the plurality of resultant images is then stored such that each of the selected one of the plurality of resultant images is retrievable to be displayed as a representation of its corresponding original image.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which.

DETAILED DESCRIPTION

Figure 1:
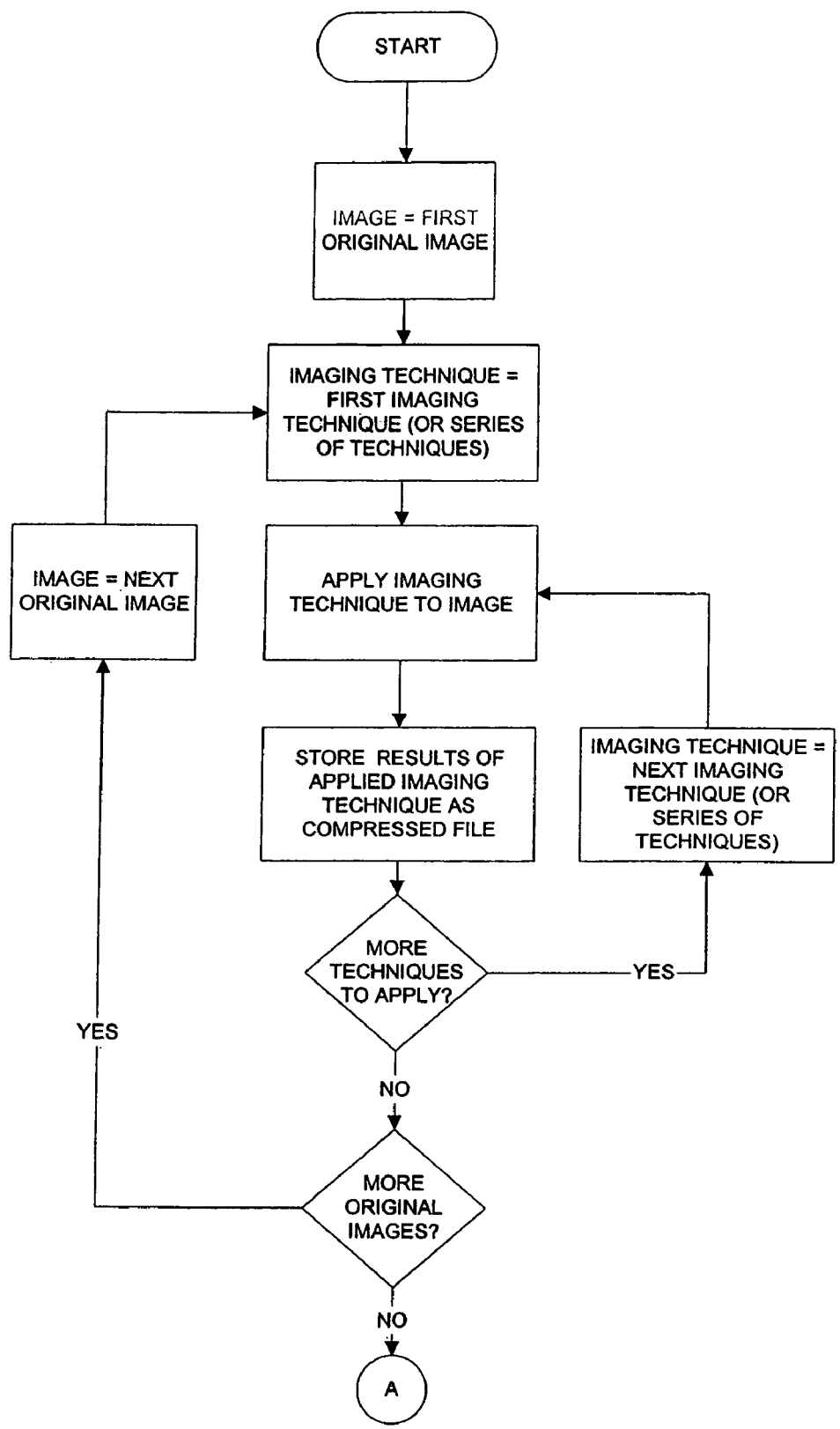
FIG. 1 illustrates a flow chart diagram of an exemplary method for creating one or more compressed versions of an original image.
Figure 2:
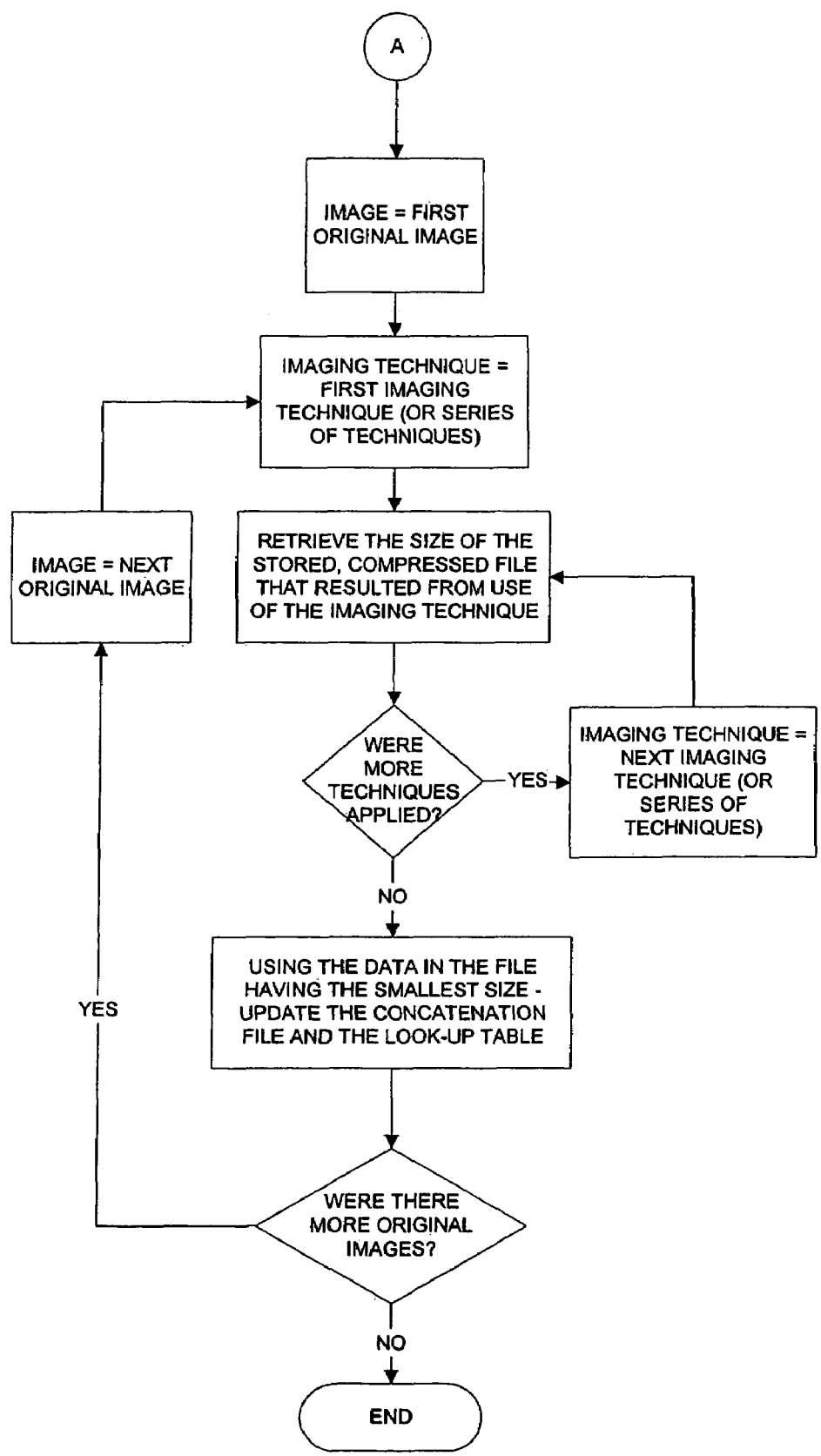
FIGS. 2 and 3 illustrate flow chart diagrams of an exemplary method for creating a concatenation file and look-up table.
Figure 3:
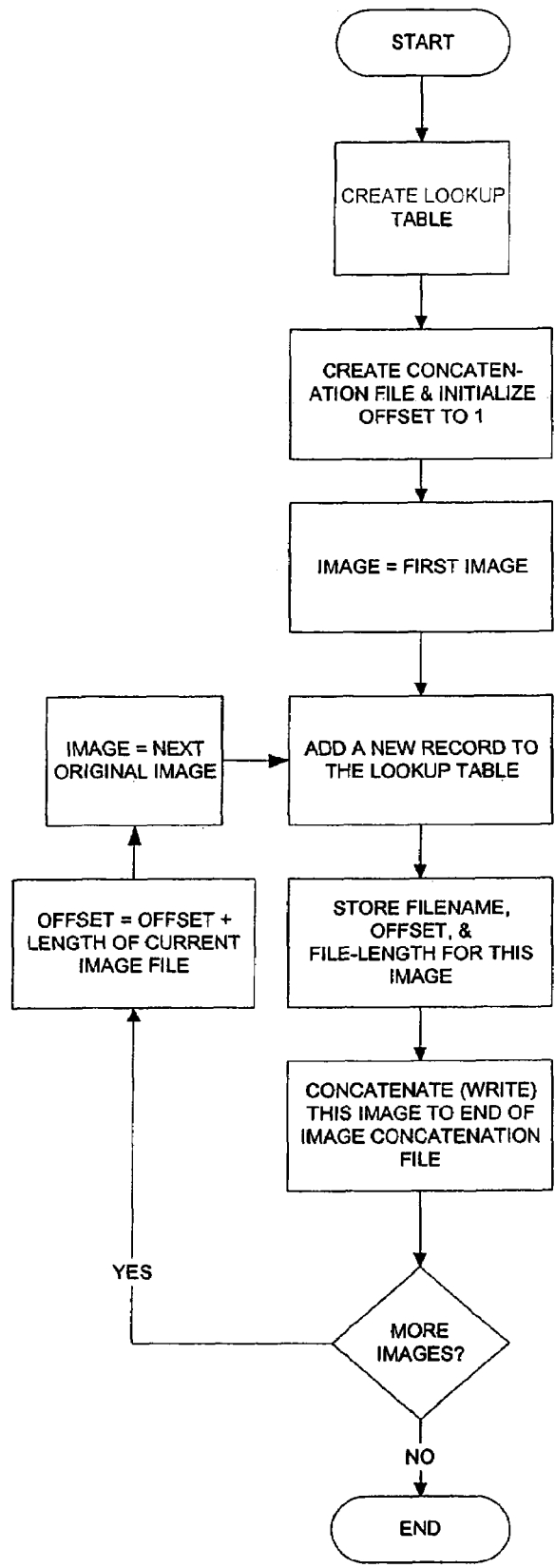
Figure 4:
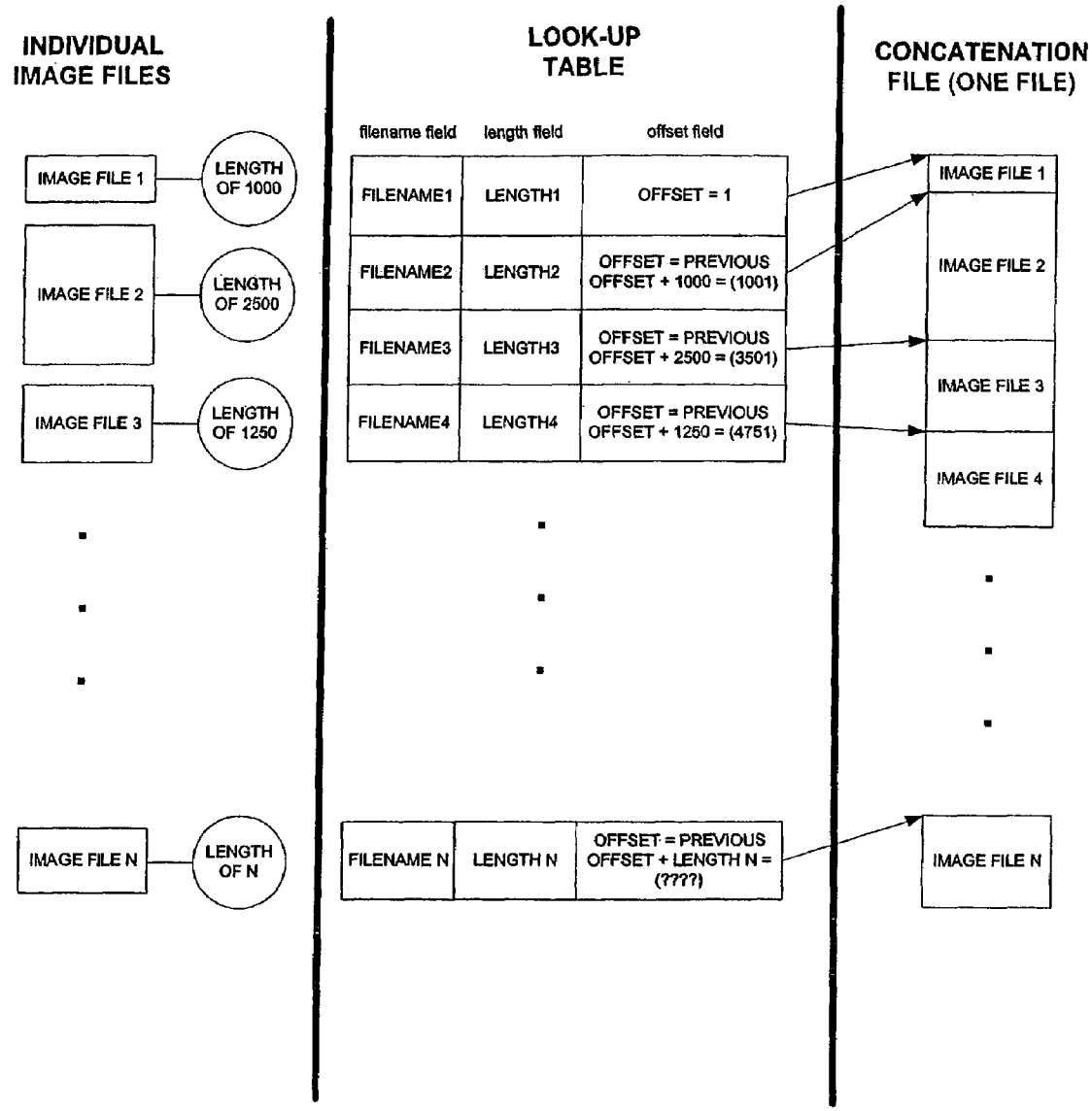
FIG. 4 illustrates an exemplary concatenation file and look-up table created by the method generally illustrated in FIGS. 2 and 3.

With reference to the figures, a system and method for modifying and preparing images for file compression, storage, and retrieval is disclosed. Generally, image compression formats, such as GIF, JPG, and PSD (PHOTOSHOP image format), are non-adaptive techniques for compressing images. That is, the compression algorithms utilized are applied in the same way for all images. However, by altering the content of an image before it is compressed (e.g., by using imaging techniques to change one or more of its orientation, coloring, sharpness, etc.), improved image compression ratios can be achieved resulting in reduced storage requirements while still maintaining the usefulness of the images. Moreover, by storing these better compression-ratio images in a particular data structure, storage requirements can be further reduced.

Achieving a better compression-ratio and reducing storage requirements are particularly useful in solving problems associated with storing information in a hand-held computing device. For example, the Compaq iPAQ brand hand-held device has memory expansion chips of limited size. For example, chips are available having 512M at a present cost of approximately $700 and 128M at a present cost of approximately $100. Thus, it will be appreciated that, when cost is a concern, efficiently utilizing smaller sized memory chips is desirable. Using the compression, storage, and retrieval techniques described hereinafter, a more efficient utilization of limited memory can be achieved. In this regard, the techniques described hereinafter have been successfully utilized to store on a memory chip of limited capacity an electronic catalog comprised of product information for approximately 100,000 products including approximately 30,000 images.

While the description that follows preferably stores images using the GIF compression format, it is to be appreciated that this is not intended to be limiting. Rather, any compression technique can be utilized. Furthermore, while described in the context of utilizing functions found in the Adobe PHOTOSHOP brand imaging software, it will be appreciated that other commercially available imaging software applications can also be utilized.

To reduce the amount of memory required to store the image files, the physical image display-size for each of the original images may be initially adjusted. This size adjustment may be vertically and/or horizontally utilizing conventional imaging techniques. Given the intended target platform of a hand-held computing device, such as the Compaq brand Pocket PC, the size adjustment can be used to create a resultant image that has a size that would allow the resultant image to be displayed in the display of the hand-held device without requiring scrolling. Since image-dimension adjusting alone may be insufficient to allow all of the resultant images, when compressed, to be fit within the memory of the hand-held device, along with any corresponding textual information, further imaging techniques may be employed to further reduce the compressed file size of the resultant images.

A further method for reducing the amount of memory required to store image files consists of manipulating the reduced or original images (hereinafter collectively referred to as the original image) using techniques available in the imaging software, such as rotating the image, sharpening the image, resampling the image, etc., before compressing the image (e.g., storing the manipulated and uncompressed image as a GIF or the like type of file). By using the techniques individually or in various sequences and combinations (which can be performed manually or automatically using macro features of the software application), a large number of resultant images can be created that represent the original image. The resultant image with the smallest compressed file size for each original image can then be selected for use in the electronic catalog. To further reduce the amount of memory required to store the compressed image files, the binary file content of the compressed, resultant images selected can be concatenated into a concatenation file, a lookup table created for accessing the binary file contents within the concatenation file, and techniques, described hereinafter, can be used to extract and display images from the concatenation file.

More specifically, there are numerous imaging techniques that can be used to prepare or manipulate the original images before compressing the manipulated image with a given image compression algorithm. It is to be understood, however, that not all imaging techniques will yield a smaller image size (when compared to the original image size) after the technique is applied and the resultant file compressed. Moreover, some techniques yield better results only for certain image types. Therefore, because the file size of a compressed, resultant file is not generally known before it is compressed, a plurality of different individual imaging techniques or combinations of imaging techniques may be applied to the original image to increase the chance that a specific imaging technique or combination of imaging techniques produces a compressed, resultant image that has file size that is smaller when compared to the compressed file size of the original image. By applying this "shotgun" approach when manipulating the image content, it is likely that several of the imaging techniques or combinations of imaging techniques create a smaller, resultant file size, when compared to the file size of the original image, for any given compression algorithm. By studying which techniques tend to work better, additional techniques can be created which magnify the effectiveness.

By way of example, the original images can be manipulated by applying one or more of the following techniques, which include, but are not limited to:

a) Rotating the original image by 90, 180, or 270 degrees and/or flipping the image—For images that contain a rotation or flipping that aided in creating a smaller compressed file, a corresponding re-rotation in the opposite direction (or further rotation to achieve a total of 360 degrees of rotation) or flipping is applied after the image is extracted and uncompressed from the concatenated file and before it is displayed on the device. In this way, it has the same orientation as the original product image. Especially with the GIF image format, it was a surprise that rotating the image 90, 180, or 270 degrees resulted in sometimes a large savings in file size.

b) Changing the number of colors in the image—Graphic images consist of pixels. Each pixel, or "dot" on the screen or printer, consists of information about the color of the pixel. One byte of information can represent one of 256 different colors or one of 256 shades of gray. By adjusting the number of bits of information for each pixel, the number of color possibilities for each pixel can be affected. More bits allow for more choices of colors for each pixel. Images with 24-bit/pixel color (over 1 million possible colors for each pixel) are near photographic quality. Images with 8-bit/pixel color (256 possible colors per pixel) are common on the Internet. In so many computing applications there is a balance between things like speed, size, complexity, etc. Depending on the application, it is sometimes a good balance to have images of moderate quality (less bits per pixel) since the size of the image is often reduced, allowing the images to fit in a fixed memory device where higher-quality images would not all fit. By reducing the number of colors in an image but still meeting the minimal quality requirements of the application, a balance is struck between memory requirements (smaller files) and image quality.

c) changing the image to grayscale if the image is murky and lacks vivid colors—In some applications, it might make sense to convert images that lack strong color content to grayscale. Grayscale images with only 4 bits/pixel (16 possible shades of gray per pixel) still look reasonable. Depending on the image format, it is possible to examine the header of the file to determine what colors exist in the image. If some or most of the colors are gray (equal amounts of red, green, and blue) or are near grayscale, then a decision can be made to convert to, say, 4-bit grayscale from a 5-bit or higher color image.

d) resampling the image at a different resolution—A technique used in music recording is resampling. Current commercial music CDs have 16-bit resolution. That is, $2^{16}$ possible values for each sample of music. Each sample of music can be thought of as corresponding to a pixel, the smallest level of granularity. If a music CD is resampled (or converted) to, say, 12-bit resolution, then the amount of information is reduced 25%. Of course, some information is lost in the process which results in a degradation of the sound. However, 12-bit resolution in music roughly corresponds to FM radio quality, which is still very acceptable even after 25% of the original information is lost off the CD the DJ is playing. In this same way, an image can be resampled at a different (usually lower) resolution. Instead of the original 72 dpi (dots per inch), the image might be resampled at 71 dpi or 70 dpi. Of course, some information in the image will be lost. However, in some cases there is a reduction in complexity of the image from the compression-algorithm's point of view (e.g., GIF) and the image will compress better and store in less space. The effect of losing some information sometimes is not noticeable. Other times this loss of information manifests itself as a "softer" image that is not as crisp and the original. If the resampling resolution is chosen carefully, smaller images are produced that are still very usable for the application.

e) sharpening the image—This is a common image manipulation technique that helps create more defined delineations between different color areas in the image. The result is that the image looks "cleaner" or "crisper." Depending on the image, this technique can make the image look better or worse (more cartoony) and can make the size of the resulting file increase of decrease when compared with the original. This process can be repeated one or more times to the same image, further increasing or decreasing the size of the file.

f) leaving the image as-is—Sometimes the original image has the smallest file size even after trying different techniques to reduce the size of the file or it is the only useable image for the intended application.

g) changing the image contrast—Another technique for trying to reduce the size of the image is adjusting the contrast of the image. By slighting increasing or decreasing the contrast, the altered image can sometimes be smaller than the original and still be useful for the application.

h) changing the image brightness—Another technique for trying to reduce the size of the image is adjusting the brightness of the image. By slightly increasing or decreasing the contrast, the altered image can sometimes be smaller than the original and still be useful for the application.

i) changing the opacity of the image.

When used in combinations, the order in which these techniques are applied to an original image can also be varied. It will be appreciated that these techniques are available as functions or sequences of functions that can be applied with an image/photo manipulation program like the PHOTOSHOP brand imaging software. Such imaging software may also provides for a macro facility where different sequences and combinations of these techniques can be recorded and applied in a batch mode. Each of these macros can then be applied across the set of original images in an automated manner.

Because it is not possible to tell ahead of time which imaging technique (or sequence of techniques) will create the smallest compressed file size for any given original image, a plurality of various techniques (or sequences of techniques) can be applied to all of the original images. Performing the techniques in a batch mode is preferred in the case of a large number of original images. For example, applying 20 image manipulation macros to about 30,000 images yield about 600,000 images of varied file sizes, some larger than the original image, some smaller than the original image. By simple inspection (either manual or automatic), the smallest sized file for the resultant images corresponding to each of the original images is found by examining the output sets created by each of the selected image manipulation techniques (for example, the 20 macros). This smallest sized of the compressed, resultant image files may then be selected and used in the concatenation method described below to collectively store the image files of choice. Alternatively, rather than select the smallest sized resultant image file that corresponds to each of the original images, the files in the output set having the smallest, collective compressed file sizes can be simply used. (e.g., the one output set from the 20 generated by the 20 macros with the smallest, collective size is selected for use). It will also be appreciated that the smallest resultant file need not be selected (for example, the image quality may not be acceptable) and that the smallest resultant file having an acceptable quality may be selected (which may lead to the result that sometime the original image file is utilized). Preferably, it is known which techniques were employed to produce the selected resultant file (e.g., the resultant files are tagged or the resultant file set is tagged to provide an indication as to what manipulation technique(s) were employed to produce the results).

Once the compressed, resultant image files that are representative of the original images are selected, the selected files are preferably stored in a concatenation file. In connection with the creation of the concatenation file, a look-up table is created that allows the image files to be individually retrieved. To this end, the look-up table may have the following fields: original_file_name, starting_position (in the concatenation file), and length_of_file. The look-up table may also include a field that describes what (if anything) should be done to a retrieved image file to allow the retrieved image file to be displayed correctly (i.e., what technique should be applied after the image file is uncompressed for display). For example, the file may need to be rotated or flipped or both if the selected file was created as a result of rotating or flipping the original image.

To create the concatenation file and look-up table, the resultant files for each of the original files is examined to determine which resultant file is the smallest. This file is then selected for inclusion in the concatenation file and the file name can be placed in the field original_file_name of the look-up table (e.g., to allow for name retrieval of the image). At this time, the data of selected file corresponding to the original image under consideration can be concatenated to the current end of the concatenation file. The byte starting position of the data being concatenated to the concatenation file is recorded in the corresponding starting_position field of the look-up table and the length of the selected file (i.e., the number of bytes written to the concatenation file) is also recorded on the same record in the length_of_file field of the look-up table. At this time, data can also be written to a technique field in the record of the look-up table to indicate the degrees the image was rotated and/or if the image was flipped when it was generated using the techniques described previously. For example, if the resultant image were subjected to a rotation of 90 degrees, it should be rotated 90 degrees in the opposite direction or another 270 degrees when displayed so as to accurately reflect the orientation of the original image. Similarly, if the resultant image were subjected to a flipping, the image should be re-flipped when it is displayed. Concerning the rotation, the data stored in the technique field can indicate the rotation that is required to correctly orient the image or the rotation that was performed on the resultant image from which the correction rotation can be easily determined. The resultant images for each of original image files may be processed in this same manner until there are no more original image files to consider using this process.

As noted, when it is desired to display an image retrieved from the concatenation file, the look-up table is consulted to determine the starting location of the image file and the length of the image file. The data may then be read from the concatenation file using this information, the data uncompressed, and appropriate imaging techniques utilized (if needed) to then display the image which is understood to be a representation of the original image. Those of ordinary skill in the art will appreciate how to code or acquire stand alone applications for applying necessary imaging techniques to the uncompressed images based on information read from the look-up table to correctly display the retrieved image.

From the foregoing, it will be appreciated that the system and method described herein allows more information to be stored in a memory of limited size. For example, the methodology allows for the reduction of slack space by creating one concatenated file (e.g., eliminating the slack space for nearly 30,000 images is a substantial saving in memory use). In this regard, slack space refers to file storage overhead. That is, memory space may be allocated in fixed, predetermined blocks such that more memory is allocated to data storage than is actually needed to store the data. By way of example, in the WINDOWS NT 4.1 brand operating system, a file that has 1 byte of information will actually take up 512 bytes of physical disk storage, i.e., 512 bytes is the predetermined block size. Percentage wise, smaller images tend to have a greater percentage of wasted slack space than larger files. However, as more and more images are present, even small amounts of slack space add up to a large amount of wasted space, especially when storage capacities are relatively small and fixed. Thus, by creating fewer files, ideally one, and concatenating the contents of each file, file by file, into these fewer concatenation files, almost all of the slack space can be eliminated.

In addition, memory is conserved by creating a smaller image directory (e.g., by creating one concatenated file, the directory space for the corresponding 30,000 images is almost entirely eliminated). As will be appreciated, file header overhead is contained in the file directory and stores information like file modification time and date, file size, attribute information, etc. While this information is helpful in some cases, for large numbers of images, this adds up to a large amount of directory space. For certain application where files are more-or-less static, this information is not needed. By eliminating it, storage space can be reduced. Thus, it will be appreciated that, since there are only a few files which now contain the data from many files, the directory space has been reduced as well.

Still further, the subject method and system provides faster deployment times (e.g., copying one large concatenated image file to a device is faster than copying 30,000 images to a device, as there is overhead with each file copied).

By way of final example, when utilized in connection with the 30,000 images that comprised the test file, the concatenation method without any image modification techniques applied yielded a file of about 110M. After carefully selecting techniques and sequences and combinations of techniques, the concatenation method had much smaller files to work with and created a file of about 69M (about 40% savings) without significantly affecting the value and usefulness of the images. Thus, utilizing the methods described herein, more data can accompany the images and applications can fit on more types of devices with less cost for memory.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A method for compressing and storing a plurality of images, comprising:
    creating for each of a plurality of original images a plurality of resultant images by altering the content of each of the plurality of original images a corresponding plurality of different ways;
    rotating at least one of the plurality of resultant images created from at least one of the plurality of original images;
    compressing each of the plurality of resultant images including the at least one rotated, resultant image;
    selecting from the plurality of compressed, resultant images created for each of the plurality of original images one compressed, resultant image;
    placing each of the selected one of the plurality of compressed, resultant images into a concatenation file;
    creating a look-up table corresponding to the concatenation file by which each of the selected one of the plurality of compressed, resultant images is retrievable from the concatenation file; and
    storing data indicative of a degree to which each of the selected one of the plurality of compressed, resultant images was rotated as compared to its corresponding original image to thereby allow for image decompression and subsequent display in keeping with original image orientation;
    wherein the corresponding plurality of different ways of altering the content of the original image are at least two selected from a group consisting of changing the number of colors in the original image, changing the original image to grayscale, resampling the original image, sharpening the original image, changing the contrast of the original image, changing the brightness of the original image, changing the opacity of the original image, and leaving the original image as-is.

2. The method as recited in claim 1, comprising using a macro in an imaging application to automate the step of creating the plurality of resultant images.

3. The method as recited in claim 1, comprising using multiple techniques to alter the content of an original image.

4. The method as recited in claim 1, wherein the look-up table comprises data indicative of a file name for each of the plurality of original images, data indicative of a starting byte location of the selected one of the plurality of compressed, resultant images in the concatenation file for each of the plurality of original images, and data indicative of the length of each of the selected one of the plurality of compressed, resultant images in the concatenation file.

5. The method as recited in claim 1, comprising adjusting the size of at least one of the original images prior to the step of creating the plurality of resultant images.

6. The method as recited in claim 1, wherein each of the plurality of resultant images is compressed into a GIF file.

7. The method as recited in claim 1, wherein the selected one of the compressed, resultant images has the smallest file size.

8. A computer-readable media having computer-executable instructions for compressing and storing a plurality of images, the instructions performing steps comprising:
    creating for each of a plurality of original images a plurality of resultant images by altering the content of each of the plurality of original images a corresponding plurality of different ways;
    rotating at least one of the plurality of resultant images created from at least one of the plurality of original images;
    compressing each of the plurality of resultant images including the at least one rotated, resultant image;
    selecting from the plurality of compressed, resultant images created for each of the plurality of original images one compressed, resultant image;
    placing each of the selected one of the plurality of compressed, resultant images into a concatenation file;
    creating a look-up table corresponding to the concatenation file by which each of the selected one of the plurality of compressed, resultant images is retrievable from the concatenation file; and
    storing data indicative of a degree to which each of the selected one of the plurality of compressed, resultant images was rotated as compared to its corresponding original image to thereby allow for image decompression and subsequent display in keeping with original image orientation;
    wherein the corresponding plurality of different ways of altering the content of the original image are at least two selected from a group consisting of changing the number of colors in the original image, changing the original image to grayscale, resampling the original image, sharpening the original image, changing the contrast of the original image, changing the brightness of the original image, changing the opacity of the original image, and leaving the original image as-is.

9. The readable media as recited in claim 8, wherein the instructions use a macro in an imaging application to automate the step of creating the plurality of resultant images.

10. The readable media as recited in claim 8, wherein the instructions use multiple techniques to alter the content of an original image.

11. The readable media as recited in claim 8, wherein the look-up table comprises data indicative of a file name for each of the plurality of original images, data indicative of a starting byte location of the selected one of the plurality of compressed, resultant images in the concatenation file for each of the plurality of original images, and data indicative of the length of each of the selected one of the plurality of compressed, resultant images in the concatenation file.

12. The readable media as recited in claim 8, wherein the instructions adjust the size of at least one of the original images prior to the step of creating the plurality of resultant images.

13. The readable media as recited in claim 8, wherein each of the plurality of resultant images is compressed into a GIF file.

14. The readable media as recited in claim 8, wherein the selected one of the compressed, resultant images has the smallest file size.

* * * * *